United States Patent
Fujii et al.

[11] Patent Number: 6,019,515
[45] Date of Patent: Feb. 1, 2000

[54] EXTERNALLY PRESSURIZED GAS BEARING ASSEMBLY

[75] Inventors: Shoji Fujii, Iwata; Yoshio Fujikawa, Shizuoka, both of Japan

[73] Assignee: NTN Corporation, Osaka, Japan

[21] Appl. No.: 09/100,109

[22] Filed: Jun. 19, 1998

[30] Foreign Application Priority Data

Jun. 23, 1997 [JP] Japan .................................. 9-165734

[51] Int. Cl.[7] .................................................. F16C 32/06
[52] U.S. Cl. ........................... 384/107; 384/113; 384/121
[58] Field of Search .................................. 384/100, 121, 384/107, 111, 113

[56] References Cited

U.S. PATENT DOCUMENTS

| | | | |
|---|---|---|---|
| 3,612,628 | 10/1971 | Steele | 384/107 |
| 3,934,948 | 1/1976 | Pruvot | 384/111 |
| 4,090,743 | 5/1978 | Suzuki et al. | 384/113 |
| 4,568,203 | 2/1986 | Eddy | 384/121 X |
| 4,836,692 | 6/1989 | Hagen | 384/107 |
| 5,073,037 | 12/1991 | Fujikawa et al. | 384/107 X |
| 5,645,354 | 7/1997 | Heinzl et al. | 384/107 X |
| 5,660,480 | 8/1997 | Fujii et al. | 384/107 |

*Primary Examiner*—Thomas R. Hannon
*Attorney, Agent, or Firm*—Birch, Stewart, Kolasch & Birch, LLP

[57] ABSTRACT

An externally pressurized gas bearing assembly including a bearing sleeve fixed in contact with an inner peripheral surface of a housing provided with a gas supply passage communicated with fine feed ports of thrust bearings and opening at an outer peripheral surface of the bearing sleeve through an interior of the bearing sleeve. The bearing sleeve supports a main shaft in an axial direction through an externally pressurized gas by a thrust bearing surface having a plurality of fine feed ports of the thrust bearing.

5 Claims, 4 Drawing Sheets

EXTERNALLY PRESSURIZED GAS BEARING ASSEMBLY

BACKGROUND OF THE INVENTION

1. Field of the Invention

The present invention relates to an externally pressurized gas bearing assembly for an externally pressurized gas bearing spindle device such as those utilized in a precision machining tool, a precision testing apparatus or the like.

2. Description of the Prior Art

The externally pressurized gas bearing spindle device includes a main shaft rotatably supported by the externally pressurized gas bearing assembly in a non-contact fashion. The externally pressurized gas bearing spindle device can give rise to a highly precise control of the rotational speed and is generally utilized in conjunction with a work spindle such as those utilized in a precision machining tool or a precision testing apparatus, or a tool spindle. Most of the prior art externally pressurized gas bearing spindle devices are made up of a number of housing assembly components. In consideration of the durability (the anti-seizing property) against the possibility of the bearing assembly contacting the main shaft a housing assembly component is constructed by press-fitting a bearing sleeve, made of a material suitable for the gas bearing assembly, into a housing made of a construction material.

One example of the prior art externally pressurized gas bearing spindle devices is shown in FIG. 4. The housing assembly component is constructed by press-fitting a bearing sleeve 2 anally into each of the opposite ends of a housing 1. A compressed air to the externally pressurized gas bearing assembly is supplied from an air supply port 11 in the housing 1 to a circumferential row of a plurality of journal bearing air supply ports 21, formed in a circumferential row in each of the bearing sleeves 2, and also to a plurality of thrust bearing air supply ports 22, similarly formed in a cir-circumferential circumferential row in each of the bearing sleeves 2, through passages 12 by way of annular grooves 13 and 14.

The externally pressurized gas bearing spindle device shown in FIG. 4 has a structure wherein respective contact surfaces of the housing 1 and each bearing sleeve 2 are brought into tight contact with each other to provide a seal against the flow of the compressed air. The contact surface B of the journal bearing portion can tightly contact the mating contact surface of the bearing sleeve 2, in view of the press-fit between the housing 1 and the bearing sleeve 2, to provide an excellent seal. However, a disadvantage of the prior art device is that it is difficult to achieve a tight contact between the housing 1 and the bearing sleeve 2 at a contact surface A of the thrust bearing portion. The reason therefor is because a force required to achieve a tight contact therebetween is not achieved; furthermore, a tight contact cannot be attained particularly where the diameter is so large that the contact surface cannot be formed precisely enough. For this reason, a sufficient seal will not be attained at a portion in the vicinity of the annular groove 14. Once the compressed air leaks because of the insufficient sealing, the amount of the compressed air consumed by the bearing assembly will increase, accompanied by reduction in ability of the bearing assembly to support the load, and this is detrimental to the performance of the bearing assembly.

Also, in the externally pressurized gas bearing assembly shown in FIG. 4, when the compressed air is supplied to the annular groove 14, an axially acting force (Compressed Air Pressure×Surface Area of a Portion of Contact Surface A Occupied by Groove 14) will be generated by the pressure of the compressed air at the contact surface A of the thrust bearing portion of the bearing sleeve 2. This axially acting force deforms the thrust bearing portion of the bearing sleeve 2 and also, pushes the bearing sleeve 2 out of the housing 1. Deformation of the thrust bearing portion of the bearing sleeve 2 will render a trust bearing gap to be uneven to such an extent as to adversely affect the performance of the bearing assembly and also reduce the sealing effect at a portion of the annular groove 14.

In addition, in the event that the compressed air leaks from the entire contact surface A of the thrust bearing portion an axially acting force of a magnitude (Compressed Air Pressure×Surface Area of Entire Contact Surface A) larger than the previously discussed anally acting force will act on the contact surface A of the bearing sleeve 2 due to the pressure of the leaking compressed air.

Many of the prior art devices use copper-containing alloy, for example, a gun metal, lead-containing bronze or beryllium-containing copper, for the bearing sleeves. Recently, the use of graphite as a material has increased due to its anti-seizing property. When a material having a low elasticity and a low strength, such as graphite, is used for the bearing sleeves, the influence brought about by the force with which the previously discussed compressed air acts on the bearing sleeve will be large. In the event that the thrust bearing portion of the bearing sleeve is deformed by the effect of the axially acting force brought about by the compressed air on the bearing sleeve, the magnitude of deformation will be considerably more than if metal is used for the bearing sleeve; thus, bearing performance will be affected adversely.

If a graphite sleeve is employed in the externally pressurized gas bearing assembly of the structure shown in FIG. 4, in view of the fact that the graphite has a relatively low strength and a relatively low elasticity, the press-fitting of the bearing sleeve 2 into the housing 1 will not result in an increase in contact pressure at the contact surface A of the journal bearing portion, as is exhibited with the use of the metal. In other words, given an allowance for the interference fit, the use of the graphite having a relatively low elasticity results in a lower contact pressure than that exhibited when metal is used. Also, if the interference for the interference fit is increased in order to increase the contact pressure, the use of graphite having a relatively low strength will result in breakage at a smaller interference for the interference fit than that as afforded by the metal. In view of this, due to the graphite having a low coefficient of friction, the retaining force of the bearing sleeve 2 brought about by the interference fit is low as compared with that brought about by the metal. Consequently, there is a possibility that by the action of the axially acting force brought about by the compressed air on the bearing sleeve, the bearing sleeve may separate from the housing.

Thus, when the graphite is used for the bearing sleeves 2 more consideration than that required where the metal is used is required in view of the problems discussed hereinabove. However, where the bearing has a large diameter, sealing of the compressed air at the contact surface A of the thrust bearing portion is difficult to achieve, thus adverse influence brought about by the compressed air is considerable. Therefore, it is difficult to design a spindle device providing proper functionality within the internal structure of the housing assembly component as is found in the prior art externally pressurized gas bearing assembly discussed above.

SUMMARY OF THE INVENTION

Accordingly, the present invention has been devised with an object of substantially eliminating the above discussed problems inherent in the prior art externally pressurized gas bearing assembly, and is intended to provide an improved externally pressurized gas bearing assembly of a type wherein the pressure of the compressed gas being supplied towards fine feed ports of the thrust bearing will neither result in deformation and/or displacement of the bearing sleeve, nor leak from a joint between respective contact surfaces of the bearing sleeve and the housing.

Another important object of the present invention is to provide an improved externally pressurized gas bearing assembly of the type referred to above, wherein any possible deformation of the bearing sleeve which would be caused by the compressed gas is prevented and, also, the resistance to seizure is increased.

The externally pressurized gas bearing assembly of the present invention is applied to the structure including a bearing sleeve fixed in contact with an inner peripheral surface of the housing, and a thrust bearing surface defined in the bearing sleeve and having a plurality of finely constricted apertures. The thrust bearing surface is adapted to axially support a main shaft by means of a compressed gas. In this externally pressurized gas bearing assembly, there is provided a gas supply circuit defined in the bearing sleeve for supplying the compressed gas, supplied from an outer peripheral surface of the bearing sleeve, to constricted thrust bearing apertures. In other words, the gas supply circuit within the bearing sleeve has no inlet opening at the end surface of the bearing sleeve, but has an inlet opening only at the outer peripheral surface thereof.

According to this structure, the compressed gas is supplied only from the radial direction of the bearing sleeve and is not supplied in the axial direction from the housing to the bearing sleeve. Therefore, no axially acting force brought about by the compressed gas will act on the bearing sleeve.

Also, since the outer peripheral surface of the bearing sleeve, to which the compressed gas is supplied from the housing, can be brought into tight contact with the housing by an interference fit, a favorable sealing effect can be obtained even though the bearing sleeve receives a radially pressing force brought about by the compressed gas; accordingly, no axially acting force, which would otherwise result from a leakage of the compressed gas from between the housing and the bearing sleeve, may occur.

In other words, there is no possibility that the bearing performance will be reduced as a result of deformation and/or displacement of the bearing sleeve under the influence of the axially acting force brought about by the compressed gas regardless of the diameter of the main shaft.

In the above described structure, the gas supply circuit in the bearing sleeve may be made up of radial passages and axial passages.

Also, instead of the use of the passages extending in two directions perpendicular to each other as discussed above, a gas supply circuit within the bearing sleeve may comprise a groove formed along an outer peripheral surface of the bearing sleeve and axial passages. In such case, since a portion of the gas supply circuit can be formed by grooving, the fluid circuit can easily be formed as compared with the use of the passages extending in the two directions.

In the externally pressurized gas bearing assembly of any one of the above described structures, a journal bearing surface may be formed in an inner peripheral surface of the bearing sleeve with fine feed ports opening at this journal bearing surface, in combination with a gas supply circuit communicated with a constricted journal bearing aperture through the gas supply circuit leading to the thrust bearing within the bearing sleeve.

By so doing, support of the main shaft in a thrust direction and also in a radial direction can be accomplished simultaneously.

Moreover, in the externally pressurized gas bearing assembly of any one of the above described structures, the bearing sleeve may be made of graphite. Where the bearing sleeve is made of graphite, and since the graphite has a relatively low strength and a relatively low elasticity, influence which would be brought about by the compressed gas on the bearing sleeve would be considerable as compared with the use of a metal as a material for the bearing sleeve, although the resistance to seizure can be increased. For this reason, an effect of the present invention to prevent any possible deformation which would otherwise be brought about by the pressure of the compressed gas can be enhanced if the graphite is used as a material for the bearing sleeve.

Also, in any one of the foregoing structures, the bearing sleeve may have a contact surface that is held in contact with an end surface of the housing.

In addition, if desired, the bearing sleeve may be fixed in each of the opposite ends of the housing, in which case the thrust bearing surface is formed at an outer end surface of each of the bearing sleeves. Alternatively, the bearing sleeve may be fixed in each of a pair of housings, in which case the thrust bearing surface is formed at respective end surfaces of the bearing sleeves which confront with each other.

BRIEF DESCRIPTION OF THE DRAWINGS

In any event, the present invention will become more clearly understood from the following description of preferred embodiments thereof, when taken in conjunction with the accompanying drawings. However; the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
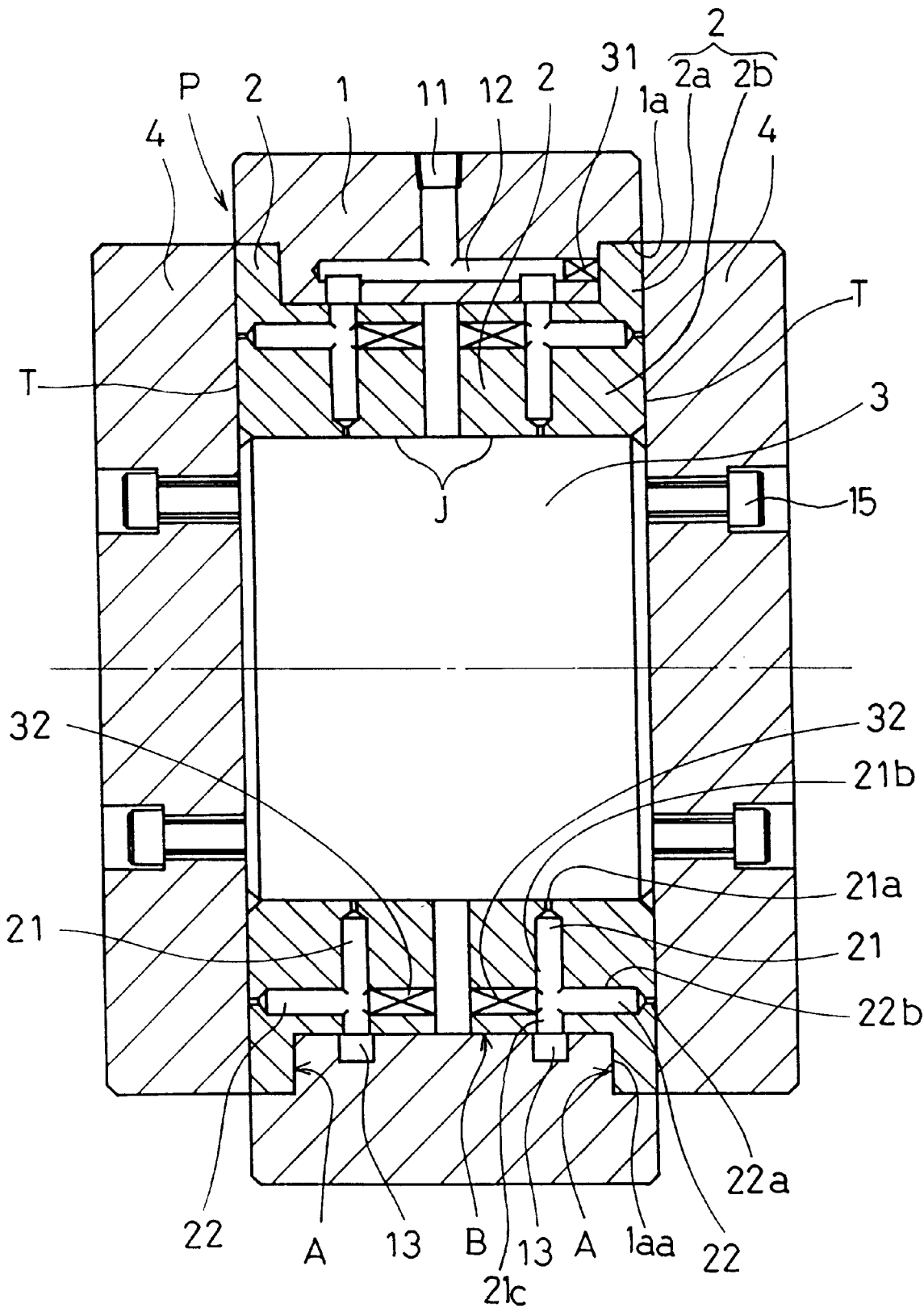
FIG. 1 is a schematic sectional view of an externally pressurized gas bearing assembly according to a first preferred embodiment of the present invention.

FIG. 1 illustrates an externally pressurized gas bearing assembly according to a first preferred embodiment of the present invention using an air as a gas. A housing assembly component P is formed by press-fitting a bearing sleeve 2 into each of opposite ends of a substantially cylindrical housing 1. The bearing sleeve 2 at each end of the cylindrical housing 1 includes a cylindrical body 2b and a collar 2a formed on an outer peripheral portion of the cylindrical body 2b. The collar 2a is adapted to fit over a large-diameter bored portion 1a which has been bored in an open edge of an inner peripheral surface of the housing 1. By utilizing an inner peripheral surface of the bearing sleeve 2 of the housing assembly component P as a bearing surface J of a journal bearing and the opposite outer end surface thereof as bearing surface T of a thrust bearing, the housing assembly component P, a main shaft 3 and a pair of thrust plates 4 are assembled together to complete the externally pressurized gas bearing assembly in the externally pressure gas bearing spindle device. The provision of the collar 2a in the bearing sleeve 2 permits a contact surface A, which is an end surface of the collar 2a of the bearing sleeve 2, to be supported by an end surface 1aa of the large-diameter bored portion 1a, which has been formed by boring in the housing 1, even when the thrust bearing receives an excessive load transmitted thereto through the thrust bearing surface T and, therefore, there is no possibility that the bearing sleeve 2 may be pushed into the housing 1. The thrust plates 4 are in the form of a disc-shaped component secured to each of opposite end surfaces of the main shaft 3 by means of bolts 15. These thrust plates 4 secured to the respective end surfaces of the main shaft 3 as described above are positioned on respective sides of a gap which provides an air layer to the thrust bearing surface T constituted by the respective end surface of the bearing sleeve 2. The main shaft 3 is inserted in journal bearing surfaces J, constituted by an inner peripheral surface of the bearing sleeve 2, through bearing gaps.

Each of the bearing sleeves 2 has a plurality of journal bearing air supply passages 21 formed in a circumferential row and extending radially thereof and also has a plurality of axially extending thrust bearing air supply passages 22 extending axially thereof so as to intersect the air supply passages 21. Respective portions of the air supply passages 21 and 22 opening at the respective bearing surfaces J and T are formed into fine feed ports 21a of journal bearing and constricted thrust bearing feed ports 22a. Unnecessary portions of the thrust bearing air supply passages 22, that is, portions of the thrust bearing air supply passages 22 on one side of the journal bearing air supply passage 21 remote from the thrust bearing surface T are closed by plugs 32 to thereby form air supply passages 22b, branched from base portions 21c of the journal bearing air supply passages 21 and positioned adjacent the thrust bearing, and air supply passages 21b adjacent the journal bearing.

The housing 1 has a single air intake port 11 opening at an outer peripheral surface thereof in a radial direction, an annular groove 13 defined therein so as to occupy the same axial position (at a location of the inner peripheral surface which is communicated with the passages 21) as that occupied by the journal bearing air supply passage 21 when the bearing sleeves 2 are assembled in the housing 1, and an axial passage 12 defined therein for communicating the annular groove 13 with the air intake port 11 for the compressed air. The port 11, the passage 12 and the annular groove 13 altogether form a compressed air intake circuit. The passage 12 is bored in an axially inward direction of the housing 1 from the large-diameter bored portion 1a, and an unnecessary portion of the passage 12 which is an end thereof opening towards the large-diameter bored portion 1a is closed by a plug 31.

The compressed air is supplied from the intake port 11 to the plural bearing air supply passages 21 and 22 through the passage 12 and the annular groove 13. By utilizing the structure in which the thrust bearing air supply passages 22 are branched from respective portions of the journal bearing air supply passages 21 within the bearing sleeves 2, the necessity of the annular groove 14 employed in the prior art externally pressurized gas bearing assembly is advantageously eliminated.

With this construction, since no annular groove for the bearing air supply is needed at the contact surface A (the surface of the collar 2a which contacts the housing 1) between the thrust bearing portion of the bearing sleeve 2 and the housing 1, no axially acting force which is brought about by the compressed air on the bearing sleeve in the prior art externally pressurized gas bearing assembly is generated. For this reason, there is no possibility that the bearing sleeve 2 may be deformed in the axial direction by the pressure of the compressed air, and a proper bearing gap of the trust bearing portion can be maintained. Also, since only the housing contact surface B of the journal bearing portion of the bearing sleeve 2 requires a sealing of the compressed air, and, since a favorable sealing effect can be obtained by the interference fit at the contact surface B of the inner and outer peripheral surfaces, there is no possibility of the compressed air leaking and, also, the bearing performance will not be adversely affected.

This structure can be applied regardless of the diameter of the main shaft 3 and is particularly effective where graphite is used as a material for each of the bearing sleeves 2. Where graphite is used as a material for the bearing sleeves 2, the anti-seizing property can be increased.

Also, where the bearing load capacity of the spindle device needs to be increased, since there is no possibility that the bearing sleeves 2 may separate from the housing 1 by the action of the compressed air supplied to the bearing assembly, this can be accomplished by increasing the pressure of the compressed air to be supplied to the bearing assembly. For this reason, a relatively large freedom of design choice can be obtained.

Figure 2:
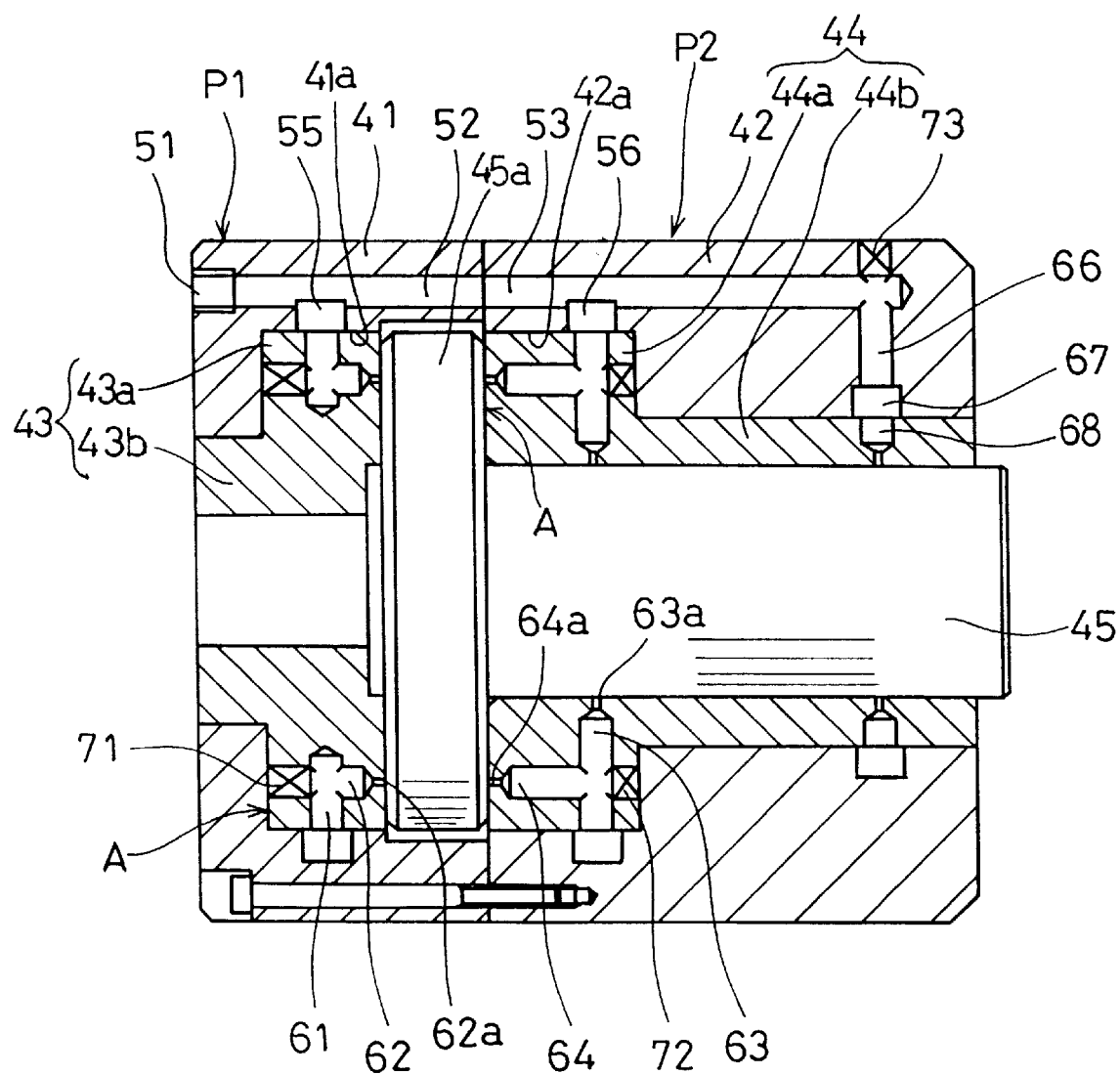
FIG. 2 is a schematic sectional view of an externally pressurized gas bearing assembly according to a second preferred embodiment of the present invention.

A second preferred embodiment of the present invention is shown in FIG. 2. In this second embodiment of the present invention, axially split housing halves 41 and 42 are provided and a first bearing sleeve 43 including a collar 43a formed on an end portion of a cylindrical body 43b thereof is press-fitted into the first split housing half 41 to complete a first housing assembly component P1. Similarly, a second bearing sleeve 44 including a collar 44a formed on an end portion of a cylindrical body 44b thereof is press-fitted into the second split housing half 41 to complete a second housing assembly component P2. The first bearing sleeve 43 of the first housing assembly component P1 is formed with a thrust bearing and the second housing assembly component P2 is formed with a thrust bearing and a journal bearing.

In the second housing assembly component P2, as is the case with the first embodiment shown in FIG. 1, the collar 44a of the second bearing sleeve 44 is formed with a plurality of journal bearing air supply passages 63 extending in a radial direction, and thrust bearing air supply passages 64 extending in an axial direction so as to intersect the respective journal bearing air supply passage 63. Respective bearing surface openings of those passages 63 and 64 serve as fine feed ports 63a of journal bearing and fine feed ports 64a of thrust bearing. Unnecessary portions of the passages 64 are closed by respective plugs 72 to form portions of the passages 64 branched from the passages 63. The compressed air can be supplied from a compressed intake port 51, formed in an end surface of the first split housing half 41 so as to extend axially, to axial intake air passages 52 and 55 formed in the first and second split housing halves 41 and 42, respectively, and then to the plural bearing air supply passages 63 and 64 through an annular groove 56 formed in the second split housing half 42 so as to open in communication with a large-diameter bored portion 42a thereof. In the second housing assembly component P2, an air supply circuit leading from the intake passage 53 in the split housing half 42 to journal bearing air supply passages 68 in the second bearing sleeve 44 through radial passage 66 and an annular groove 67 in the inner peripheral surface of the housing half 42 is additionally formed.

In the first housing assembly component P1, the first bearing sleeve 43 is formed with a plurality of radially extending passages 61 and axially extending thrust bearing air supply passages 62 extending in an axial direction so as to intersect the respective radially extending passages 61. Unnecessary portions of the passages 62 are closed by respective plugs 71 to form the passages 62 branched from the passages 61. Respective open ends of the passages 62 adjacent the bearing surface serve as fine feed ports 62a of thrust bearing. The compressed air can be supplied from the air intake port 51 to the thrust bearing air supply passages 62 through the intake passage 52 and then through an annular groove 55, formed in tie housing half 41 and the passages 61 formed in the first split housing half 41.

The first and second housing assembly components P1 and P2 are combined with a main shaft 45, formed at one end with a flange 45a that is supported by the thrust bearing, to complete the externally pressurized gas bearing assembly for the externally pressurized gas bearing spindle device.

Even with this construction according to the second embodiment of the present invention, since no annular groove is needed in the contact surface A between the housing halves 41 and 42 of the bearing sleeves 43 and 44, no axially acting force will not be generated by the compressed air in the bearing sleeves 43 and 44 in any one of the first and second housing assembly components P1 and P2. Also, effects similar to those brought about by the first embodiment of the present invention can also be obtained.

Figure 3:
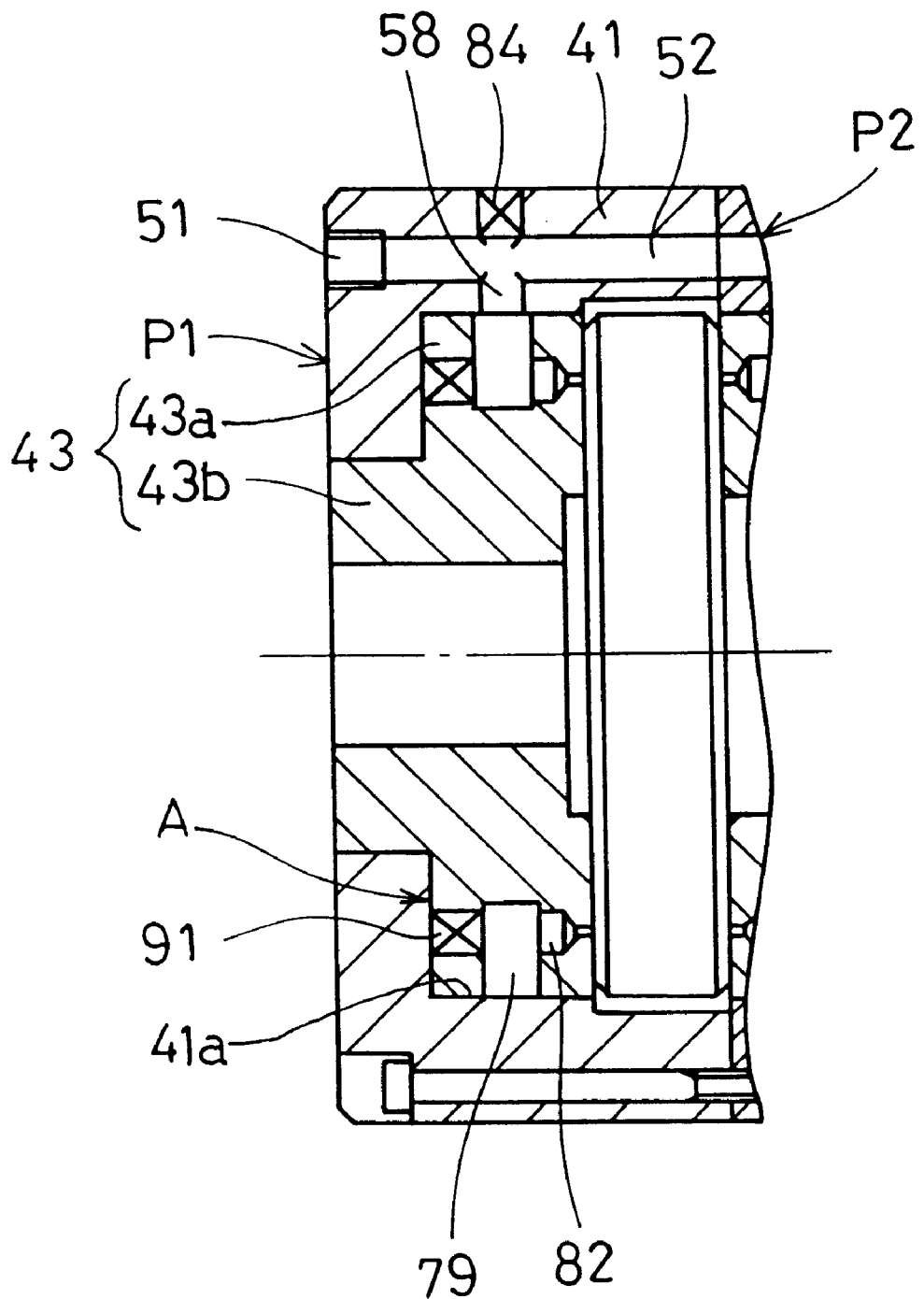
FIG. 3 is a schematic sectional view of an externally pressurized gas bearing assembly according to a third preferred embodiment of the present invention.
Figure 4:
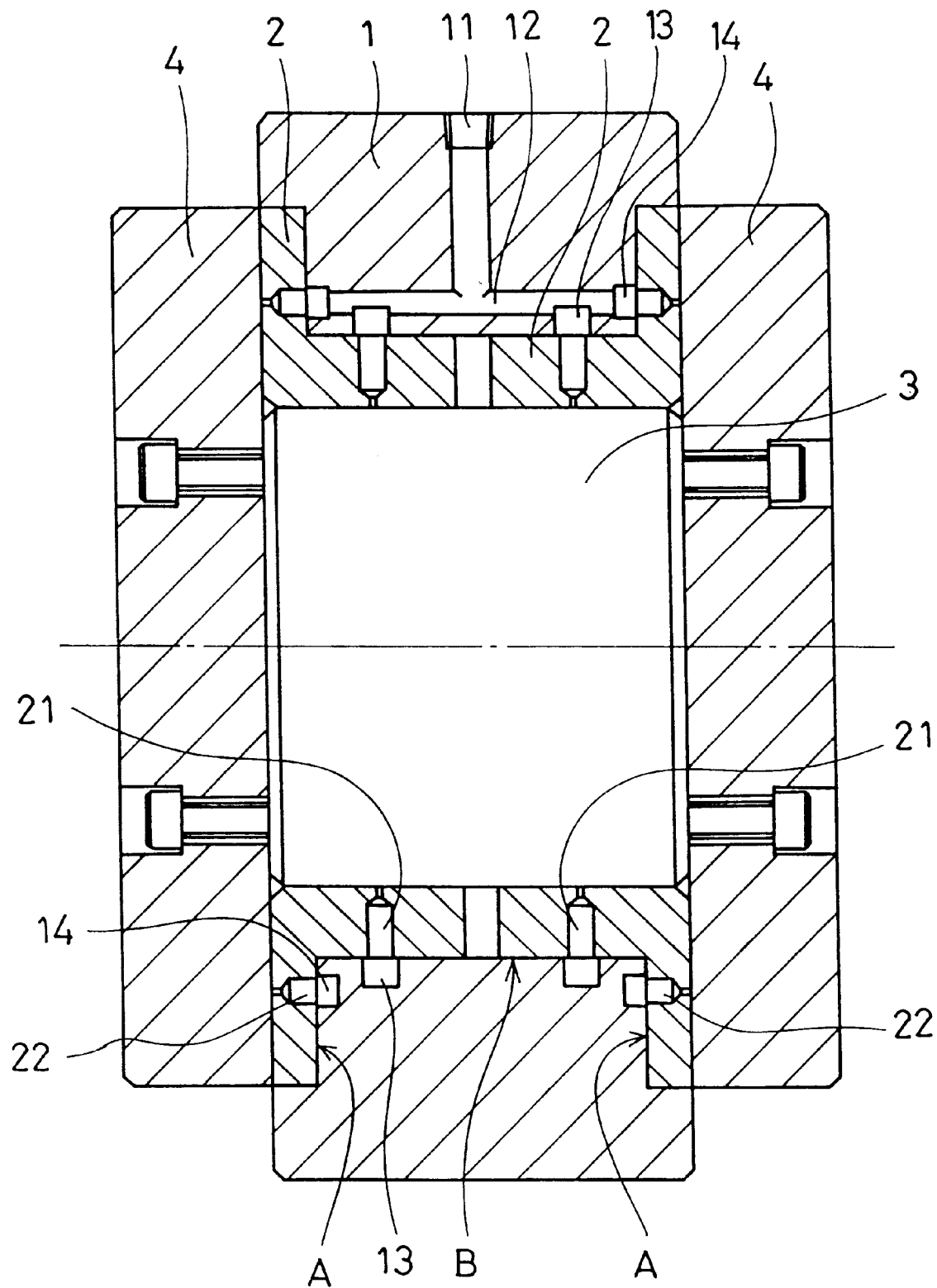
FIG. 4 is a schematic sectional view of the prior art externally pressurized gas bearing assembly.

FIG. 3 illustrates a third preferred embodiment of the present invention in which the thrust bearing air supply circuit in the first housing assembly component P1 of the externally pressurized gas bearing assembly shown in and described with reference to FIG. 2 takes a different structure.

In the embodiment shown in FIG. 3, an annular groove 79 open at an outer periphery of the collar 43a and a plurality of thrust bearing air supply passages 82 extending axially in communication with the annular groove 79 are formed in the collar 43a of the bearing sleeve 43, and unnecessary portions of the passages 82 are closed by respective plugs 91. In the first housing half 41 is formed a radial passage 58 connecting the air intake passage 52 with the annular groove 79. The annular groove 79 concurrently performs a function of the annular groove 55 on the housing side, shown in FIG. 2, and also a function of the radial passages 61 on the bearing sleeve side shown in FIG. 2.

The compressed air can be supplied from the air intake port 51 to the thrust bearing air supply passages 82 through the passages 52 and 58 and then through the annular groove 79. Even with this structure, no axial force resulting from the compressed air will act on the bearing sleeve 43.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. An externally pressurized gas bearing assembly which comprises:

a housing;

a bearing sleeve fixed in contact with an inner peripheral surface of the housing and having a thrust bearing surface, said thrust bearing surface having a plurality of axial fine feed ports defined in the bearing sleeve, said thrust bearing surface being adapted to axially support a main shaft by means of a compressed gas; and a gas supply circuit defined in the bearing sleeve for supplying the compressed gas, supplied from an outer peripheral surface of the bearing sleeve, to the axial fine feed ports of thrust bearings through an interior of the bearing sleeve, wherein the gas supply circuit in the bearing sleeve comprises axial passages and radial passages each in a corresponding number to the axial feed ports, each of the axial passages having one end portion opening at the thrust bearing surface formed with the axial fine feed ports and the other end portion closed by a plug, and each of the radial passages intersecting the axial passage and having one end portion opening at a journal bearing surface formed with radial fine feed ports.

2. The externally pressurized gas bearing assembly as claimed in claim 1, wherein the bearing sleeve is made of graphite.

3. The externally pressurized gas bearing assembly as claimed in claim 1, wherein the bearing sleeve has a contact surface that is held in contact with an end surface of the housing.

4. The externally pressurized gas bearing assembly as claimed in claim 1, wherein the bearing sleeve is fixed in each of opposite ends of the housing and the thrust bearing surface is formed at an outer end surface of each of the bearing sleeves.

5. An externally pressurized gas bearing assembly which comprises:

a housing having a pair of axially split housing halves;

a pair of bearing sleeves fixed in contact with an inner peripheral surface of the respective housing halves and each having a thrust bearing surface, said thrust bearing surface being formed at respective end surfaces of the bearing sleeves which confront with each other and having a plurality of axial fine feed ports defined in each of the bearing sleeves, said thrust bearing surface being adapted to axially support a main shaft by means of a compressed gas; and a gas supply circuit defined in the bearing sleeve for supplying the compressed gas, supplied from an outer peripheral surface of the bearing sleeve, to the axial fine feed ports of thrust bearings through an interior of the bearing sleeve, wherein the gas supply circuit in at least one of the bearing sleeves comprises axial passages and radial passages each in a corresponding number to the axial fine feed ports, each of the axial passages having one end portion opening at the thrust bearing surface formed with the axial fine feed ports and the other end portion closed by a plug, and each of the radial passages intersecting the axial passage and having one end portion opening at a journal bearing surface formed with radial fine feed ports.

* * * * *